Patented Jan. 13, 1925.

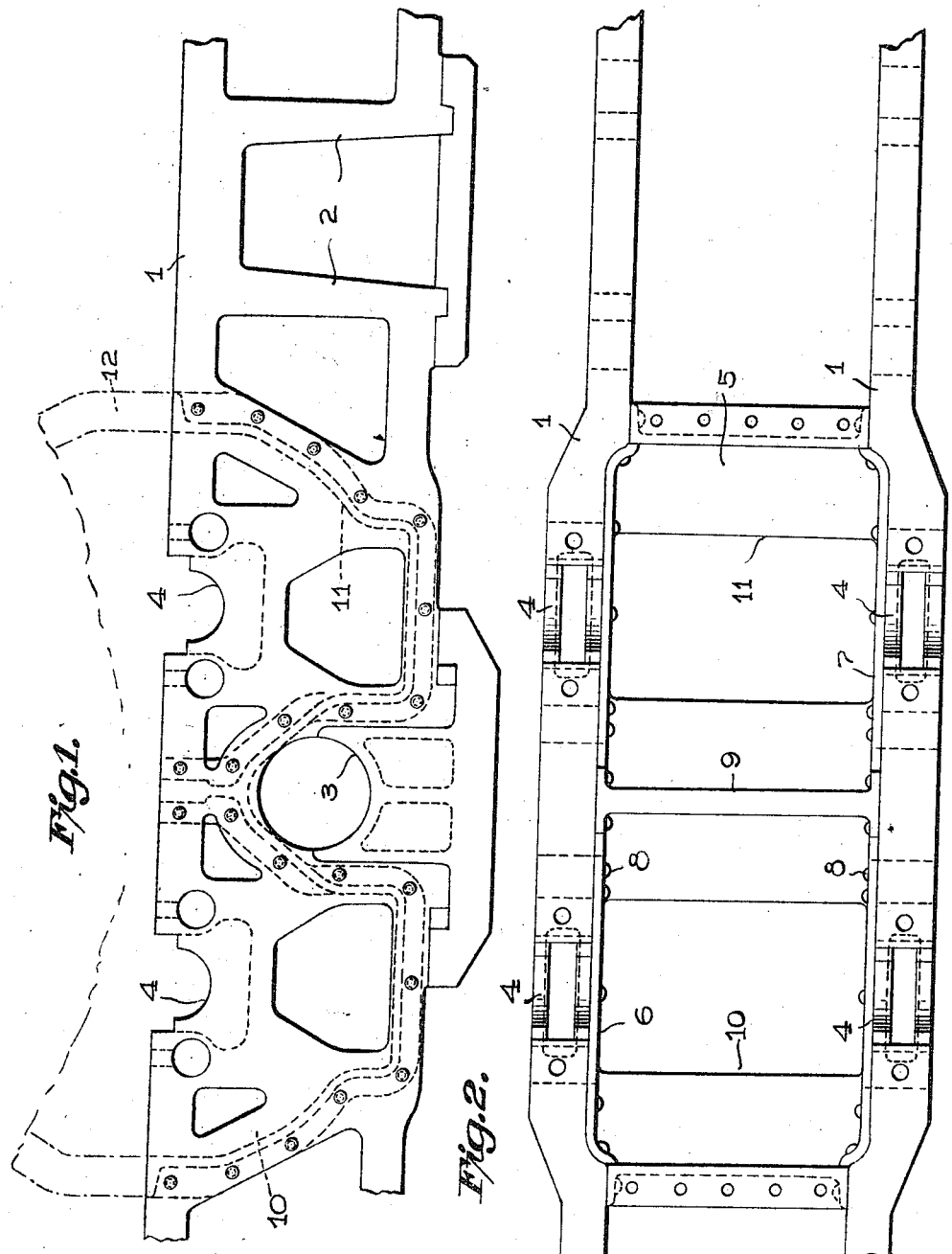

1,522,754

UNITED STATES PATENT OFFICE.

ROBERT SIEGFRIED AND HERBERT G. JUNGK, OF PITTSBURGH, PENNSYLVANIA, ASSIGNORS TO WESTINGHOUSE ELECTRIC AND MANUFACTURING COMPANY, A CORPORATION OF PENNSYLVANIA.

MOTOR-FRAME MOUNTING.

Application filed January 13, 1922. Serial No. 528,923.

*To all whom it may concern:*

Be it known that we, ROBERT SIEGFRIED, a citizen of the United States, and a resident of Pittsburgh, in the county of Allegheny and State of Pennsylvania, and HERBERT G. JUNGK, a citizen of the United States, and a resident of Pittsburgh, in the county of Allegheny and State of Pennsylvania, have invented a new and useful Improvement in Motor-Frame Mountings, of which the following is a specification.

Our invention relates to electric locomotives, more especially to locomotive-motor-frame and side-frame construction.

It is among the objects of this invention to provide a unitary, twin-motor housing which shall provide a rigid, reinforced structure with the locomotive side frames.

Another object of this invention is to provide a pair of locomotive side frames having a pair of motor bearing journals symmetrically disposed on both sides of a common jackshaft bearing journal to provide a fixed center relation between the motors and the jackshaft and to provide a separate motor housing which shall act as reinforcing tie rods between the side-frame members.

Another object of this invention is to provide a structure of the above designated type which shall be of simple construction, which may be readily assembled, which shall be accessible for motor fittings and the like and which shall be relatively inexpensive to manufacture.

In our copending application, filed Jan. 13, 1922, Serial Number 528,922, is described a combination twin-motor cradle mounting and locomotive side frames which provides separate motor bearing journal housings in alignment with a common jackshaft bearing journal.

In our present invention, we provide a pair of side frames in which the motor bearing journals and the jackshaft journal are contained within a solid, unitary structure and in which the motor housing, comprising a single casting or forging, is disposed transversely to the frames and secured therebetween to provide a rigid, unitary structure for the motors and permit of considerable flexing of the side-frame members between the several motor mountings, which, in a locomotive, usually consist of two sets.

In the accompanying drawings constituting a part hereof, in which like reference characters designate like parts, Figure 1 is a side elevational view of a portion of a locomotive frame having a twin-motor housing mounted therebetween; and Fig. 2 is a top plan view thereof.

Locomotive side frames 1 are provided with a plurality of pedestals 2 for mounting the journal boxes of the driving wheel axles (not shown). The side frames are further provided with jackshaft journals 3 and a plurality of motor bearing journals 4 symmetrically disposed on both sides of the journal 3.

The journals 3 and 4 are in alignment, respectively, on both sides of the frame members 1 which are maintained in their respective positions by a motor housing 5 mounted between said frames 1 and are secured thereto along the flanges 6 and 7 of said housing by suitable rivets or bolts 8. The motor housing 5 is reinforced with a web 9 across its central body portion dividing the housing into a pair of individual motor housings 10 and 11, of substantially U-shape, in which the motor stators are mounted. The side frames 1 may be further secured with suitable tie-rods to obtain any degree of rigidity in the frame member in any desired location.

The respective journal bearings are machined after assembly of the two side frames 1 to insure alignment with the side frames and motor housing and may be located for machining from the central jackshaft bearings to provide an accurate and fixed center distance relation.

A suitable cover 12 is mounted on the housing 5 and side frames 1 to enclose the motors, the covers functioning as parts of the motor frame. The cover may consist of a single structure or a pair of individual covers may be employed to enclose the motors separately. In either case, the cover will tend to further reinforce the structure to obtain a rigid motor mounting.

It will be readily understood from the above description of our invention that this design provides a simple, relatively inexpensive construction for locomotive motor mountings and that the unitary journal housing provides an absolute fixed center distance between the respective journal members, which are maintained in alignment by the rigid reinforced motor housing mounted therebetween.

Although we have described a specific embodiment of our invention it will be obvious to those skilled in the art that various modifications may be made in the details of construction thereof without departing from the principles herein set forth. For instance, the side frame construction may be designed to accommodate any special condition of application and it may be provided with a suitable rib structure to provide adequate strength. The motor housing may be of a suitable design to accommodate itself to the fittings of the side frames and jackshaft and it may be provided with suitable reinforcing webs to obtain strength of structure. The motor housing may be either a casting or a drop forging and the cover may be formed of similar material.

We claim as our invention:

1. The combination with a pair of locomotive side frames, of a twin motor housing disposed transversely thereof and between the side frames, a cover disposed on said motor housing, said motor housing and side frames being secured on the vertical inner faces of the latter to form a unitary structure.

2. The combination with a pair of locomotive side frames, of a unitary twin-motor housing disposed transversely thereof and between the side frames, said motor housing having a reinforcing web across its central body portion dividing the said motor housing into a pair of individual motor housings of substantially U-shape.

3. The combination with a pair of locomotive side frames, of a unitary twin-motor housing disposed transversely thereof and between the side frames, said motor housing having flanges along its edges for securing the same to the side frames and having a reinforcing web across its central body portion dividing the housing into a pair of individual motor housings of substantially U-shape.

4. The combination with a pair of locomotive side frames having a jackshaft journal and a pair of motor bearing journals symmetrically located therein, of a unitary, twin-motor housing disposed transversely thereof and between said side frames, said motor housing having flanges formed along its edges for securing the same to the side frame and having a reinforcing web across its central body portion dividing the housing into a pair of individual motor housings of substantially U-shape symmetrically disposed on both sides of said jackshaft journal.

5. The combination with a pair of locomotive side frames having a plurality of motor journal bearings and a jackshaft journal bearing integral therewith, of a motor housing disposed therebetween, said motor housing being secured along the inner sides of said side frames, said motor housing having flanges formed along its edges for securing the same to the side frame and having a reinforcing web across its central body portion dividing the housing into a pair of individual motor housings of substantially U-shape symmetrically disposed on both sides of said jackshaft journal.

In testimony whereof, we have hereunto subscribed our names this 10th day of January, 1922.

ROBERT SIEGFRIED.
HERBERT G. JUNGK.